US010250527B2

(12) United States Patent
Lin

(10) Patent No.: US 10,250,527 B2
(45) Date of Patent: Apr. 2, 2019

(54) PORT EXTENDER ID ASSIGNMENT IN AN EXTENDED BRIDGE

(71) Applicant: ARRIS Enterprises LLC, Suwanee, GA (US)

(72) Inventor: Kwun-Nan Kevin Lin, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/489,395

(22) Filed: Apr. 17, 2017

(65) Prior Publication Data

US 2018/0063035 A1    Mar. 1, 2018

Related U.S. Application Data

(60) Provisional application No. 62/382,589, filed on Sep. 1, 2016.

(51) Int. Cl.
*H04L 12/931* (2013.01)
*H04L 12/46* (2006.01)

(52) U.S. Cl.
CPC .......... *H04L 49/45* (2013.01); *H04L 12/4645* (2013.01); *H04L 49/35* (2013.01)

(58) Field of Classification Search
None
See application file for complete search history.

(56) References Cited

U.S. PATENT DOCUMENTS

| 6,950,855 B2 | 9/2005 | Sampathkumar |
| 7,558,835 B1 | 7/2009 | Shafer |
| 7,675,869 B1 | 3/2010 | Anker et al. |
| 2012/0307828 A1* | 12/2012 | Agarwal ................ H04L 49/70 370/392 |
| 2014/0156906 A1 | 6/2014 | Babu et al. |
| 2014/0181275 A1 | 6/2014 | Lin et al. |
| 2014/0269710 A1* | 9/2014 | Sundaram ............ H04L 45/302 370/392 |
| 2017/0085488 A1 | 3/2017 | Bhattacharya et al. |

(Continued)

FOREIGN PATENT DOCUMENTS

| EP | 2696538 A1 | 2/2014 |
| WO | 2017062671 A1 | 4/2017 |
| WO | 2017070587 A1 | 4/2017 |

OTHER PUBLICATIONS

U.S. Appl. No. 15/595,747, filed May 15, 2017 by Bipin Agarwal (Unpublished.).

(Continued)

*Primary Examiner* — Diane L Lo
(74) *Attorney, Agent, or Firm* — Stewart M. Wiener

(57) ABSTRACT

Techniques for facilitating port extender (PE) ID assignment in an extended bridge are provided. According to one set of embodiments, a controlling bridge (CB) can store a set of one or more port extender PE ID configurations for the extended bridge. At least one PE ID configuration in the stored set can include (1) an identity of a first CB port, and (2) a plurality of PE IDs corresponding to PEs connected to the first CB port, in connection order. In cases where the plurality of PEs form a ring that also connects to a second CB port, the at least one PE ID configuration can also include an identity of the second CB port.

21 Claims, 8 Drawing Sheets

(56) References Cited

U.S. PATENT DOCUMENTS

| | | |
|---|---|---|
| 2017/0093628 A1 | 3/2017 | Lin et al. |
| 2017/0104626 A1 | 4/2017 | Lin et al. |
| 2017/0104665 A1 | 4/2017 | Gowthaman |
| 2017/0104694 A1 | 4/2017 | Lin et al. |
| 2017/0111296 A1 | 4/2017 | Agarwal et al. |
| 2017/0118041 A1 | 4/2017 | Bhattacharya et al. |
| 2017/0118042 A1 | 4/2017 | Bhattacharya et al. |

OTHER PUBLICATIONS

Cisco Nexus 5600 Series NX-OS Layer 2 Switching Configuration Guide, Release 7.x; Mar. 15, 2014; Cisco Systems, Inc.; 280 pages.

Configuring the Fabric Extender, Chapter 2; Cisco Nexus 2000 Series Fabric Extender Software Configuration Guide; 16 pages.

Configuring Port Extender Stack; Dell Networking C9010/C1048P; Jan. 30, 2017; https://qrl.dell.com/Files/enus/Html/C9010_C1048P/Configuring%20PE%20Stack.html; 3 pages.

Understanding Junos Fusion Provider Edge Components; Technical Documentation—Support—Juniper Networks; Mar. 31, 2017; 5 pages; https://www.juniper.net/documentation/en_US/junos/topics/concept/fusion-components.html.

U.S. Appl. No. 15/229,012, filed Aug. 4, 2016 by Lin et al. (Unpublished.).

U.S. Appl. No. 15/243,782, filed Aug. 22, 2016 by Ramesh Gowthaman (Unpublished.).

U.S. Appl. No. 15/272,218, filed Sep. 21, 2016 by Somen Bhattacharya (Unpublished.).

U.S. Appl. No. 15/276,579, filed Sep. 26, 2016 by Kwun-Nan Kevin Lin et al. (Unpublished.).

U.S. Appl. No. 15/276,619, filed Sep. 26, 2016 by Kwun-Nan Kevin Lin et al. (Unpublished.).

U.S. Appl. No. 15/286,472, filed Oct. 5, 2016 by Bipin Agarwal et al. (Unpublished.).

U.S. Appl. No. 15/331,067, filed Oct. 21, 2016 by Somen Bhattacharya et al. (Unpublished.).

U.S. Appl. No. 15/331,160, filed Oct. 21, 2016 by Somen Bhattacharya et al. (Unpublished.).

Cisco IOS Command Modes; http://www.cisco.com/c/en/us/td/docs/ios/12_2/configfun/configuration/guide/ffun_c/fcf019.html#wp1000922; Mar. 25, 2016; 20 pages.

Dell C9010 Module Switch Interoperability with Cisco Catalyst 3750, A Development Guide for Dell Networking Switches (v1.0), Dell Network Solutions Engineering, Sep. 2015, 24 pages.

Dell Networking C1048P Getting Started Guide, Sep. 2015, 26 pages.

Juniper Networks, Junos Fusion Provider Edge, Release 14.2R4, Feb. 17, 2016, 646 pages.

Cisco StackWise and StackWise Plus Technology, 2016 Cisco, Mar. 25, 2016, 11 pages.

Dell Stack Master Election, Dell Networking Configuration Guide for the C9000 Series Version 9.9 (0.0), Mar. 25, 2016, 1 page.

Dell Networking Configuration Guide for the C9000 Series, Version 9.9 (0.0), Oct. 2015, 1148 pages.

International Search Report and Written Opinion for International Appln. No. PCT/US2016/055827 dated Jan. 25, 2017, 15 pages.

Virtual Bridged Local Area Networks-Bridge Port Extension, IEEE Computer Society, IEEE Std 802.1 BR-2012, Jul. 16, 2012, 121 pages.

Brocade FastIron Switch Port Extender, Configuration Guide, Supporting FastIron Software Release 8.0.40, Feb. 29, 2016, 88 pages.

International Search Report and Written Opinion for International Appln. No. PCT/US2016/058283 dated Feb. 17, 2017, 12 pages.

Lockwood et al., "Automated Tools to Implement and Test Internet Systems in Recontigurable Hardware", ACM SIGCOMM Computer Communications Review, vol. 33, No. 3, Jul. 2003, pp. 103-110.

\* cited by examiner

PORT EXTENDER ID ASSIGNMENT IN AN EXTENDED BRIDGE

CROSS-REFERENCES TO RELATED APPLICATIONS

The present application claims the benefit and priority of U.S. Provisional Patent Application No. 62/382,589, filed Sep. 1, 2016, entitled "TECHNIQUES FOR PORT EXTENDER ID ASSIGNMENT." The entire contents of this application are incorporated herein by reference for all purposes.

BACKGROUND

An extended bridge is a network topology that is based on the Institute of Electrical and Electronics Engineers (IEEE) 802.1BR standard and comprises two different types of units: a controlling bridge (CB) unit and one or more port extender (PE) units. The CB serves as the controller of the extended bridge and is responsible for performing control plane functions (e.g., Layer 2 switching, Layer 3 routing, etc.) with respect to network traffic that passes through the extended bridge. In contrast the PEs, which connect to the CB and to other network devices/hosts external to the extended bridge, act as non-intelligent devices and thus do not perform any local switching or routing; instead, their primary function is to provide additional data port terminations for the CB. For example, each PE may be a switch/router with X number of physical data ports, which appear as virtual data ports on the CB. Upon receiving a data packet from an external device/host on an ingress data port, the PE forwards the data packet to the CB, which processes the data packet in hardware and/or software to determine an appropriate egress port of the extended bridge through which the packet should be sent out. The CB then forwards the data packet to the PE housing the egress port for transmission through that port towards the next hop destination.

The links that interconnect the PEs to each other and to the CB in an extended bridge are known as cascade links. These cascade links are considered internal to the extended bridge since they only carry network traffic that has been tagged with a special ETAG header that is understood by the PEs and CB. The ETAG header facilitates the internal routing of traffic from an ingress PE to the CB for processing, as well as from the CB to the egress PE(s) that will forward the traffic out of the extended bridge. A PE may connect directly to the CB or may connect indirectly to the CB via one or more intermediate PEs. For example, multiple PEs may form a chain with one end, or both ends, connected to the CB. In the case where both ends of a PE chain are connected to the CB, the PE chain is referred to as a PE ring.

Generally speaking, PEs may join (i.e., be physically attached to) and leave (i.e., be physically detached from) an extended bridge at any time. When a PE joins the extended bridge, the CB generates and stores configuration information for the PE that enables the CB to integrate the PE into the extended bridge and to manage the PE's operation. As part of this process, the CB must assign an identifier, known as a PE ID, to the joining PE so that the CB can reference the PE in its configuration. For example, the CB typically represents the ports of a PE using the format x/y/z, where x is the PE ID, y is the PE I/O module (if applicable), and z is the port number. Thus, the CB must know what the PE ID for the PE should be before it can generate and store x/y/z-based port configurations.

One known method for performing PE ID assignment involves requiring a user to enter, on the CB, the hardware serial number or MAC address of each PE that is part of the extended bridge. The CB then uses these serial numbers or MAC addresses as the PE IDs. However, this method is inconvenient because the user needs to first find the serial number or MAC address of each PE (by, e.g., physically inspecting the PE device label) before he/she can enter it on the CB. In addition, this method does not work for "unit replacement," which is a scenario where an existing PE unit in the extended bridge is replaced with a new PE unit of the same type/model. In the case of unit replacement, the new PE will serve the same role as the original PE, and thus the new PE should have the same configuration and same PE ID as the original PE. However, this is not possible if the PE IDs are based on hardware-specific serial numbers or MAC addresses, since these serial numbers/MAC addresses will necessarily be different for each unit.

Another known method for performing PE ID assignment involves requiring a user to enter, on the CB, a single user-defined PE ID for each port of the CB. For example, the user may enter PE ID X for CB port P1, PE ID Y for CB port P2, and so on. This user-defined PE ID is then assigned to the PE connected the CB port. However, this method also suffers from a number of limitations. First, since it requires the user to manually enter the PE IDs (rather than automatically generating them), the user must figure out which PE IDs use. Second, since the user can only enter a single PE ID per CB port, this method is limited to extended bridge topologies in which a single PE is connected to each CB port, and thus does not support topologies with chains/rings of PEs. Third, this method does not allow the user to easily implement "PE movement," which involves moving a PE to a different location in the extended bridge (e.g., connecting it to a different CB port) while at the same time keeping the PE's originally assigned ID. To implement PE movement using this assignment method, the user must detach the PE, change the CB port-level configuration, and then reattach the PE, which can be a tedious process.

SUMMARY

Techniques for facilitating port extender (PE) ID assignment in an extended bridge are provided. According to one set of embodiments, a controlling bridge (CB) can store a set of one or more port extender PE ID configurations for the extended bridge. At least one PE ID configuration in the stored set can include (1) an identity of a first CB port, and (2) a plurality of PE IDs corresponding to PEs connected to the first CB port, in connection order. In cases where the plurality of PEs form a ring that also connects to a second CB port, the at least one PE ID configuration can also include an identity of the second CB port.

A further understanding of the nature and advantages of the embodiments disclosed herein can be realized by reference to the remaining portions of the specification and the attached drawings.

DETAILED DESCRIPTION

Figure 1:
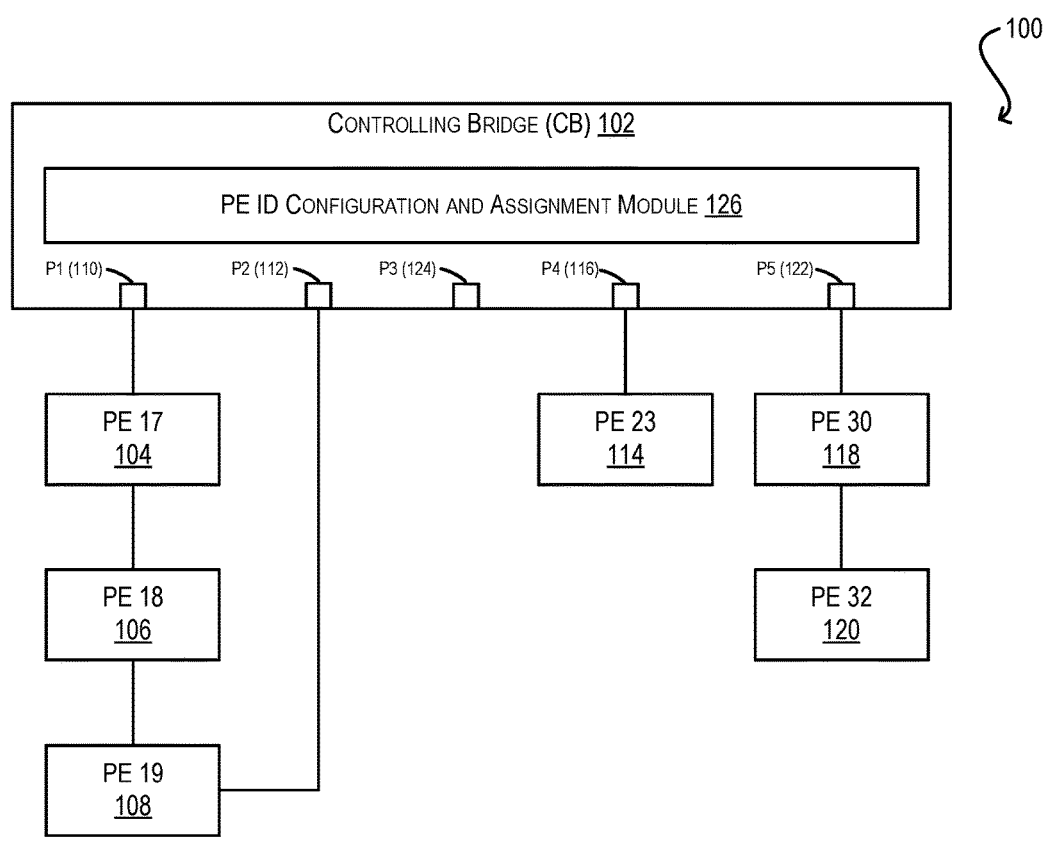
FIG. 1 depicts a simplified block diagram of an example extended bridge according to one embodiment.

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

Embodiments of the present disclosure provide techniques that can be performed by a CB in an extended bridge for facilitating the assignment of PE IDs to the PEs in the extended bridge. At a high level, these techniques involve storing, at the CB, a connection-based "PE ID configuration" for each of one or more ports of the CB. This PE ID configuration can identify the CB port itself and the PE IDs of one or more PEs that are connected (or may be connected in the future) to that CB port, in connection order. In cases where the PEs form a PE ring and thus attach to a second CB port on the other end of the ring, the PE ID configuration can also identify the second CB port. By way of example, the following are two PE ID configurations for CB ports p1 and p2 respectively:

pe-id p1 1 2 3 4
pe-id p2 15 16 17 p3

Listing 1

The first PE ID configuration above indicates that there are (or may be in the future) a chain of four PEs connected to CB port p1, and the PE IDs of these four PEs are (or should be) 1, 2, 3, and 4 in order from p1. The second PE ID configuration above indicates that there are (or may be in the future) a ring of 3 PEs connected to CB port p2 on one end and to CB port p3 on the other end, and the PE IDs of these three PEs are (or should be) 15, 16, and 17 in order from p2.

Generally speaking, PE ID configurations can be created and updated on the CB in one of two ways: (1) they can be entered/edited by users using, e.g., a "pe-id" command line interface (CLI) command (or some other similar command), and/or (2) they can be generated/updated automatically by the CB at the time of a bridge topology change. With respect to (1), users can use the pe-id CLI command to enter and edit "provisional" PE IDs for future PEs that have not yet joined the extended bridge. For example, if there is no PE currently connected to CB port p4, the user can use the pe-id CLI command to enter a brand new PE ID configuration for p4 as follows:

pe-id p4 21

Listing 2

This new PE ID configuration specifies that any PE that is directly connected to CB port p4 in the future should be assigned the provisional PE ID of 21. Thus, this mechanism enables users to anticipate future PE additions and to assign desired PE IDs to those future PEs in advance.

It should be noted that, in certain embodiments, users may not be allowed to use the pe-id CLI command in order to change the PE IDs of PEs that have already joined the extended bridge. This is because changing the PE ID of an existing PE may inadvertently disrupt that PE's runtime operation. However, in these cases, a separate "PE ID change" command/tool can be provided that enables users perform this function in a safe and efficient manner (described in Section (5) below).

With respect to (2), at the time a new PE joins the extended bridge, the CB can execute an algorithm for automatically assigning a PE ID to the joining PE. This, in turn, can cause the CB to create a new PE ID configuration (or update a stored PE ID configuration) for the CB port to which the joining PE has been attached. In one set of embodiments, this algorithm can operate according to one of two different modes: a default mode and a PE movement mode. In the default mode, the CB can assign the joining PE a PE ID that is based on a stored PE ID configuration for the corresponding CB port (if such a configuration exists). For example, assume that the joining PE is the third downstream PE from a CB port p5, and the following PE ID configuration for p5 is stored on the CB:

pe-id p5 30 31 32

Listing 3

In this case, the CB can assign the joining PE a PE ID of 32, since this is the PE ID that corresponds to the location of the joining PE in the PE ID configuration above. If there is no stored PE ID configuration for the CB port (or if there is no PE ID at the location of the joining PE in a stored PE ID configuration for the CB port), the CB can determine a PE ID for the PE based on other criteria, which may result in the assignment of a brand new PE ID.

In the PE movement mode, the CB can assign the joining PE a PE ID that was previously assigned to the PE prior to the current join process. The CB may receive this previously assigned PE ID via, e.g., a Link Layer Discovery Protocol (LLDP) join message that is transmitted by the PE at the time of joining the extended bridge. If there is no previously assigned PE ID, the CB can use the PE ID configured for that PE in a stored PE ID configuration (if such a configuration exists), or generate a brand new PE ID for the PE (if no such PE ID configuration exists).

Once the CB has assigned a PE ID to the joining PE, the CB can generate a new set of PE ID configurations, referred to herein as "topology-based PE ID configurations," based on the current physical topology of the extended bridge. These topology-based PE ID configurations can include the PE ID assigned to the newly joined PE. Finally, the CB can merge the topology-based PE ID configurations into the CB's stored PE ID configurations, thereby updating the stored PE ID configurations in view of the latest changes to the bridge's physical topology. In various embodiments, this merging process can intelligently split or combine PE ID configurations as needed in accordance with the topology change (described in further detail below).

With the foregoing techniques, a number of advantages can be realized over existing approaches to PE ID assignment. First, since the PE ID configurations described herein are connection-based and can include PE IDs for all of the PEs that are (or will be) attached to a given CB port in connection order, the techniques of the present disclosure can support extended bridge topologies that comprise chains and/or rings of PEs. This is not possible via a port-level configuration approach in which only a single PE ID is defined per CB port.

Second, while users can define (via the pe-id CLI command) PE ID configurations for provisional PEs that may be attached to the extended bridge in the future, this step is optional. In other words, there is no need for users to explicitly provide/configure PE IDs. If there is no PE ID configured on the CB for a given PE at the time that PE joins the extended bridge, the CB can automatically generate a new PE ID for the joining PE as mentioned above and can generate a new corresponding PE ID configuration (or update a stored PE ID configuration). The CB can also automatically merge this new/updated PE ID configuration into the set of PE ID configurations that are already stored on the CB.

Third, by supporting two different PE ID assignment modes (i.e., the default mode and the PE movement mode), the CB can accommodate PE ID assignment for various different types of scenarios. For example, if a user wishes to replace a PE in the extended bridge with a new unit of the same type/model and keep the same PE ID (i.e., the unit replacement scenario), the CB can be configured by the user to operate in the default mode and thus cause the new replacement PE to be assigned the same PE ID as the original PE (since the CB will use the PE ID in the stored PE ID configuration for that PE location). On the other hand, if the user wishes to move an existing PE in the extended bridge from one location in the bridge to another while keeping the PE's assigned PE ID (i.e., the PE movement scenario), the CB can be configured by the user to operate in the PE movement mode and thus cause the moved PE to retain its previously assigned PE ID upon rejoining the bridge.

Fourth, as noted above, in certain embodiments the CB can implement a PE ID change command/tool (which is separate from the pe-id CLI command) that enables users to safely and efficiently change the PE IDs of PEs that have already joined the extended bridge. In particular, this PE ID change command/tool can enable users to change the PE IDs of existing PEs without having to manually detach the PEs, modify configurations on the CB, and then manually reattach the PEs (as required by prior art methods).

These and other aspects of the present disclosure are described in further detail in the sections that follow.

2. Example Extended Bridge and High-Level Workflow

FIG. 1 is a simplified block diagram of an extended bridge 100 in which the PE ID assignment techniques of the present disclosure may be implemented. In this example, extended bridge 100 includes a CB 102 that is connected to a ring of three PEs (PE 17 (104), PE 18 (106), and PE 19 (108)) via CB ports p1 (110) and p2 (112). CB 102 is also connected to a single PE 23 (114) via CB port p4 (116), and to a chain of two PEs (PE 30 (118) and PE 32 (120)) via CB port p5 (122). There are no PEs currently connected to CB port p3 (124).

As noted in the Background section, PE ID assignment is an important part of the bridge management responsibilities of CB 102. For instance, CB 102 needs to assign a unique PE ID to each PE 104, 106, 108, 114, 118, and 120 in order to generate configuration information for that PE (e.g., port configurations, etc.) and to manage the PE's operation. However, existing approaches to PE ID assignment suffer from a number of limitations that make them less than optimal. For example, one existing approach is to have a user enter a unique hardware serial number or MAC address for each PE of the extended bridge, which is then used as the PE's ID. However, this approach can be burdensome for the user (particularly in large scale deployments) and fails to work for unit replacement scenarios.

Another existing approach is to have a user enter CB port-level configurations that identify, for each port of CB 102, a PE ID for the PE directly attached to that CB port. However, since the port-level configurations are limited to a single PE ID per CB port, they cannot support extended bridge topologies that have PE chains or rings, such as the extended bridge of FIG. 1. In addition, this approach does not readily support PE movement.

To address the foregoing and other similar issues, CB 102 of FIG. 1 is enhanced to include a novel PE ID configuration and assignment module 126 (referred to herein as "PE ID module" 126 for short). In one set of embodiments, PE ID module 126 can be implemented as software that is executed by, e.g., a management processor of CB 102 (not shown). In other embodiments, PE ID module 126 can be implemented partially or entirely in hardware.

Figure 2:
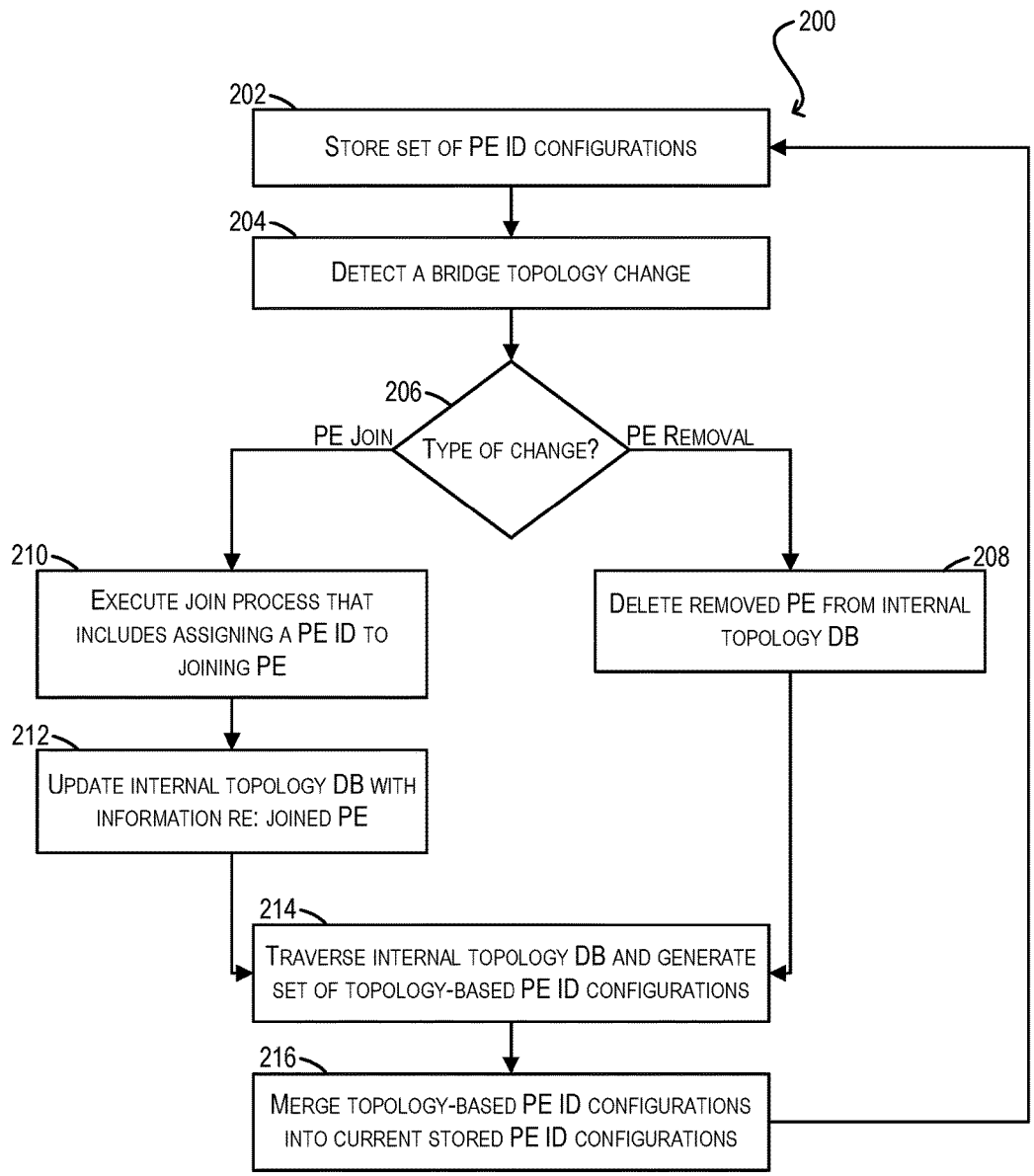
FIG. 2 depicts a high-level workflow for maintaining and generating PE ID configurations according to one embodiment.

At a high level, PE ID module 126 can implement a number of functions that facilitate the creation, modification, and assignment of PE IDs to the PEs of extended bridge 100. An example workflow of these functions is shown in FIG. 2 in the form of flowchart 200. Starting with block 202 of flowchart 200, PE ID module 126 can maintain/store a set of PE ID configurations that identify the PE IDs for PEs which are (or will be) connected to CB 102's ports. Each such PE ID configuration can specify a given CB port and the PE(s) connected to that CB port, in connection order. In cases where the PEs form a PE ring, the PE ID configuration can specify the two CB ports at the endpoints of the ring.

For example, the following is one possible set of PE ID configurations that can be stored by PE ID module 126 for the specific bridge topology shown in FIG. 1:

pe-id p1 17 18 19 p2
pe-id p3 20 21
pe-id p4 23 24 25
pe-id p5 30 32

Listing 4

In this set, the PE ID configurations for CB ports p3 and p4 respectively include more PE IDs than the actual number of PEs shown in FIG. 1. For instance, the PE ID configuration for p3 (i.e., "pe-id p3 20 21") identifies two PE IDs 20 and 21 although no PEs are currently connected to port p3. These "extra" PE IDs are provisional PE IDs for PEs that may be attached to extended bridge 100 in the future at those topology locations. As mentioned previously, such provisional PE IDs (and associated PE ID configurations) may be optionally entered by a user via a "pe-id" CLI command, or some similar command, that is exposed by PE ID module 126. The other PE IDs in the configuration set above can be considered "actual" PE IDs that are currently assigned to the corresponding PEs in extended bridge 100.

At blocks 204 and 206, CB 102 can detect a bridge topology change and determine whether the change corresponds to the joining of a PE to extended bridge 100 or the removal of a PE from extended bridge 100. CB 102 may detect the joining of a PE by virtue of receiving an LLDP join message from that PE, and may detect the removal of a PE by determining a port down status with respect to the cascade port(s) linking to that PE.

If CB 102 detects the removal of a PE at block 206, CB 102 can delete the PE from an internal topology database that tracks the topology of the extended bridge (block 208).

CB 102 may also take other steps, such as delete certain configurations maintained on the CB for the removed PE.

On the other hand, if CB 102 detects the joining of a PE at block 206, CB 102 can execute a join process that involves, among other things, assigning a PE ID to the joining PE via PE ID module 126 (block 210). As described in further detail below, this PE ID assignment sub-process can include determining whether to operate in a default mode (which is useful for, e.g., unit replacement) or a PE movement mode (which is useful for PE movement) and then assigning the joining PE a PE ID that is appropriate based on the current operating mode. For example, if PE ID module 126 determines that it should operate in the default mode, module 126 can assign a PE ID using logic that first looks for a stored PE ID configuration on CB 102 that pertains to the topology location where the joining PE has been attached. Alternatively, if PE ID module 126 determines that it should operate in the PE movement mode, module 126 can assign a PE ID using logic that first looks for a previously assigned PE ID for the joining PE (which may be received via, e.g., the LLDP join message sent by that PE). If neither of these criteria are met in either mode, PE ID module 126 may assign a brand new PE ID to the joining PE.

At block 212, assuming the join process and PE ID assignment sub-process are successful, CB 102 can update its internal topology database with information regarding the newly joined PE and its assigned PE ID. Then, at block 214 (which follows either block 212 in the PE join scenario or block 208 in the PE removal scenario), PE ID module 126 can traverse the internal topology database and determine a new set of topology-based PE ID configurations that reflect the current physical topology of extended bridge 100. In the case where a PE has joined extended bridge 100, the topology-generated PE ID configurations can include the PE ID assigned to the newly joined PE. In the case where a PE has been removed from extended bridge 100, the topology-generated PE ID configurations can exclude the PE ID assigned to the removed PE.

For example, assume that a new PE is attached to PE 32 of extended bridge 100 and joins the bridge per blocks 210 and 212. Further assume that PE ID module 126 assigns this new PE a PE ID of 33. In this case, PE ID module 126 can generate the following set of topology-based PE ID configurations at block 214, which includes the new PE ID 33 in the PE ID configuration for CB port p5:

pe-id p1 17 18 19 p2
pe-id p4 23
pe-id p5 30 32 33

Listing 5

Once PE ID module 126 has created the topology-based PE ID configurations, module 126 can merge those configurations into the current PE ID configurations that are stored on the CB (block 216). In this way, PE ID module 126 can update its stored PE ID configurations to reflect the latest changes to the extended bridge's physical topology. In one set of embodiments, this merging process can involve overriding portions of the stored PE ID configurations that conflict with the topology-based PE ID configurations, while preserving portions of the stored PE ID configurations that do not conflict with the topology-based PE ID configurations. Stated another way, the merged PE ID configurations can be a superset of the topology-based PE ID configurations. For instance, the following is a set of merged PE ID configurations for extended bridge 100 that may result from merging the topology-based PE ID configurations in Listing 5 into the original PE ID configurations in Listing 4:

pe-id p1 17 18 19 p2
pe-id p3 20 21
pe-id p4 23 24 25
pe-id p5 30 32 33

Listing 6

Finally, upon completing the merging, the workflow can return to block 202 so that the merged set of PE ID configurations can be stored on the CB (and thus become the "current" stored set). The entire process can then be repeated in response to further bridge topology changes.

It should be appreciated that FIGS. 1 and 2 are illustrative and various modifications are possible. For example, although FIG. 1 depicts a particular extended bridge topology for purposes of explanation, any other type of topology may be used. Further, although FIG. 2 depicts a particular sequence of steps, the order of these steps may be modified, certain steps may be added, and/or certain steps may be removed. For instance, in some embodiments CB 102 may not have any stored PE ID configurations prior to the occurrence of a first topology change (e.g., the joining of the first PE to the extended bridge). This may be the case if, e.g., no provisional PE ID configurations are entered by a user via the pe-id CLI command. In these embodiments, the topology-based PE ID configurations generated by PE ID module 126 at block 214 will represent the first set of PE ID configurations that are stored by CB 102, and merging step 216 can be omitted for this initial iteration of flowchart 200. One of ordinary skill in the art will recognize other variations, modifications, and alternatives.

3. PE Join Process and PE ID Assignment

Figure 3:
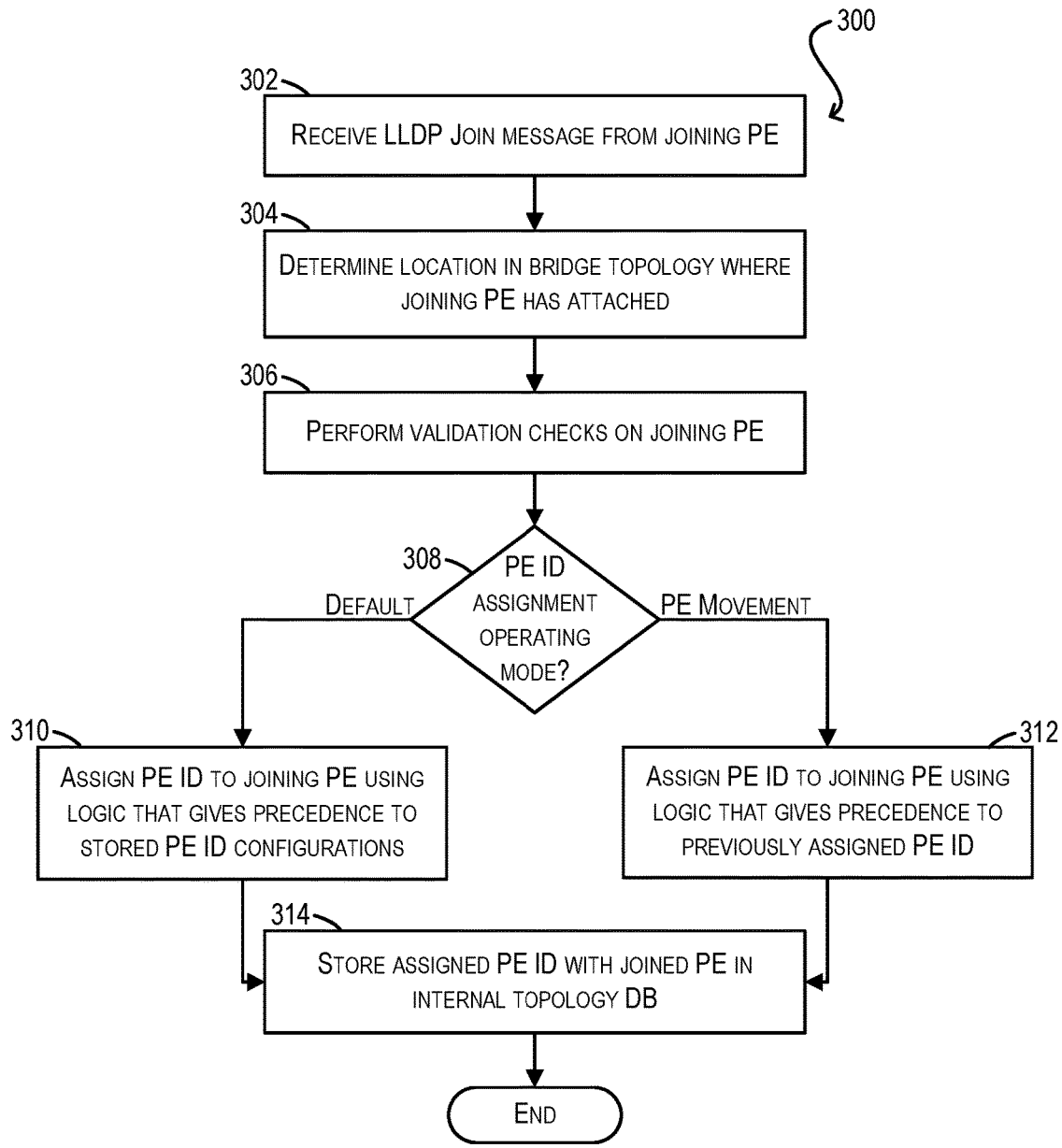
FIG. 3 depicts a PE join and PE ID assignment workflow according to one embodiment.

The remaining portions of this disclosure provide additional details on how CB 102, and in particular PE ID module 126, may implement the various functions described in FIG. 2 and the foregoing sections. For example, FIG. 3 depicts a flowchart 300 that CB 102/PE ID module 126 may use to carry out the PE join process and PE ID assignment sub-process described with respect to block 210 of FIG. 2 according to an embodiment.

Starting with block 302, at the time a particular PE joins (i.e., is physically attached to) extended bridge 100, CB 102 can receive an LLDP join message transmitted by the joining PE. It should be noted that each PE in an extended bridge will generally send LLDP join messages towards the CB on a periodic basis, regardless of whether that PE has already joined the bridge or is just beginning the join process. However, for purposes of this flowchart, it will be assumed that the LLDP join message received at block 302 is from a new PE (i.e., a PE that is starting the join process and thus has not yet been assigned a PE ID).

In one set of embodiments, the LLDP join message can include the following fields:

The PE's MAC address

CB 102's MAC address (if the PE has not joined extended bridge 100 before, this field will be empty or null)

MAC address of the CB that the PE was previously attached to (if there is no previous CB, this field will be empty or null)

PE's currently assigned PE ID (since this is a new PE, this field will be empty or null)

PE's previously assigned PE ID (i.e., PE ID that was previously assigned to the PE before it detached from its previous CB; if there is no previously assigned PE ID, this field will be empty or null)

Flag indicating that a PE ID change is taking place (described in Section (5) below)

The egress port of the PE from which this join message was transmitted

At block 304, CB 102 can determine the location in the bridge topology where the joining PE has attached. CB 102 can determine this location based on, e.g., the PE egress port (included in the join message), the CB port on which the join message is received, and the upstream PE port from which the join message was forwarded (if such an upstream PE exists). In various embodiments, CB 102 can identify the upstream PE port from the ETAG header attached to the join message.

Upon determining the joining PE's location, CB 102 can perform a number of validation checks to ensure that the new PE connection is valid/legitimate (block 306). For instance, CB 102 may check whether the length of the PE chain to which the PE has been attached has not exceeded a predefined threshold. CB 102 may also check whether the upstream PE port or link aggregation group (LAG) that is connected to the joining PE is allowed to have a downstream link.

Assuming the validation checks at block 306 are successful, PE ID module 126 can proceed to carry out a PE ID assignment sub-process for assigning a PE ID to the joining PE. As part of this sub-process, PE ID module 126 can check whether it should operate in the default mode or the PE movement mode (block 308). In some embodiments, PE ID module 126 can make this determination based on a user-configurable setting that is exposed to users via a CLI (or some other user interface) of CB 102. In other embodiments, PE ID module 126 can make this determination based on information included in the received join message (e.g., the PE ID change flag noted above and described in further detail below).

Figure 4:
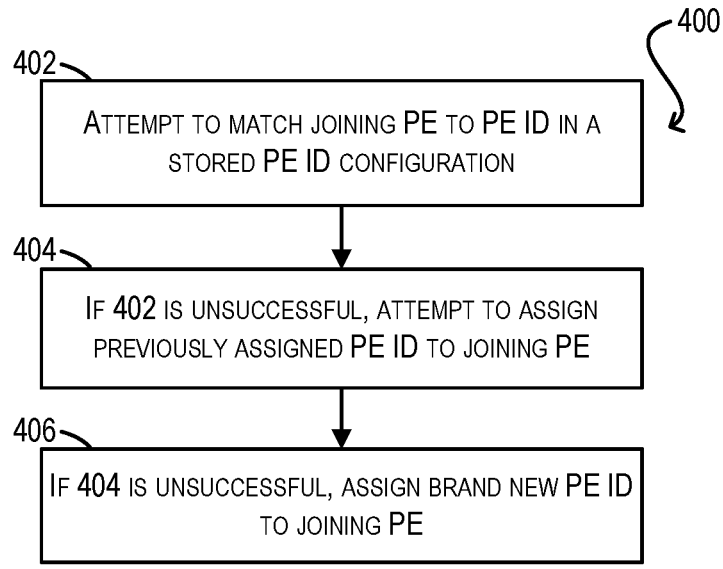
FIG. 4 depicts logic for performing PE ID assignment according to a default mode according to one embodiment.

If PE ID module 126 determines at block 308 that it should operate in the default mode, module 126 can assign a PE ID to the joining PE using logic that gives precedence/priority to the CB's stored PE ID configurations (block 310). An exemplary flowchart 400 for this logic is shown in FIG. 4. For example, at block 402 of FIG. 4, PE ID module 126 can first attempt to "match" the joining PE to a PE ID in a stored PE ID configuration and thereby assign the matched PE ID to the joining PE. One way to perform this matching is as follows:

1. Search for a stored PE ID configuration for the CB port to which the joining PE has attached (i.e., CB port pX); this can include looking for stored PE ID configurations that begin with pX and that end with pX (to account for PE rings)
   a. If no such PE ID configurations are found, the matching will fail
2. If a stored PE ID configuration is found that beings with pX:
   a. If there is no upstream PE between the joining PE and the CB (i.e., the joining PE is directed attached), assign the first PE ID in the PE ID configuration to the joining PE
   b. Otherwise, search for the upstream PE in the PE ID configuration; if there is an PE ID after the upstream PE ID in the configuration, assign that PE ID to the joining PE
3. If a stored PE ID configuration is found that ends with pX:
   a. Perform steps 2(a) and 2(b) above but in reverse connection order If PE ID module 126 cannot find a matching PE ID in a stored PE ID configuration at block 402, module 126 can then attempt to assign the "previously assigned ID" included in the join message as the PE ID for the joining PE (block 404). In order for this to be successful, the previously assigned ID field in the join message should be non-empty/non-null and should identify a PE ID that is not currently in use by any other PE in the extended bridge.

Finally, if PE ID module 126 cannot assign the previously assigned ID, module 126 can generate and assign a brand new PE ID to the joining PE (block 406). In a particular embodiment, the manner in which PE ID module 126 generates this new PE ID can vary depending on the reason(s) why the assignment attempts at blocks 402 and 404 failed. For example, if PE ID module 126 was able to find a stored PE ID configuration for CB port pX at block 402 and an upstream PE ID (but no PE ID following the upstream PE ID), module 126 may assign a new PE ID to the joining PE that corresponds to the upstream PE ID+1. Other types of PE ID generation methods are also possible (e.g., random, sequence-based, etc.). Generally speaking, the only restriction on the new PE ID generated at block 406 is that it cannot be in use by any existing PE in the extended bridge.

Figure 5:
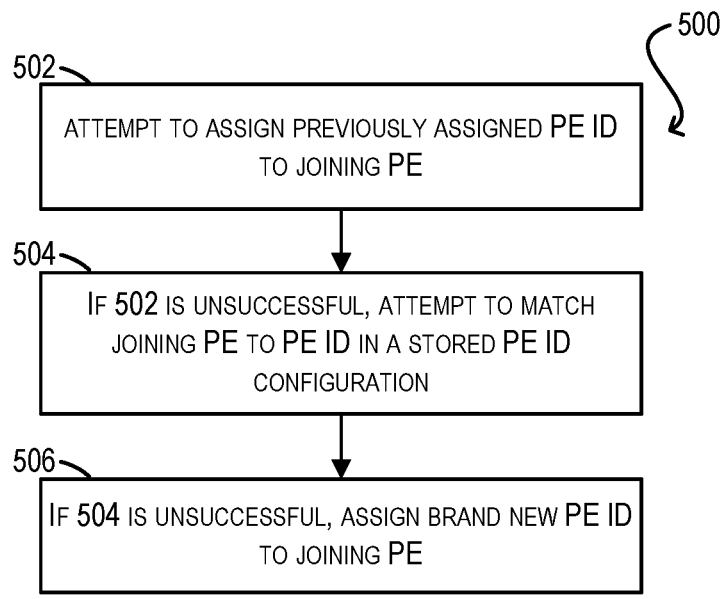
FIG. 5 depicts logic for performing PE ID assignment according to a PE movement mode according to one embodiment.

Returning now to FIG. 3, if PE ID module 126 determines at block 308 that it should operate in the PE movement mode, module 126 can assign a PE ID to the joining PE using logic that gives precedence/priority to the previously assigned ID field of the join message (block 312). An exemplary flowchart 500 for this logic is shown in FIG. 5. For example, at block 502 of FIG. 5, PE ID module 126 can first attempt to assign the previously assigned ID as the PE ID for the joining PE. As mentioned above, in order for this to be successful, the previously assigned ID field in the join message should be non-empty/non-null and should identify a PE ID that is not currently in use by any other PE in the extended bridge.

If PE ID module 126 cannot assign the previously assigned ID, module 126 can then attempt to match the joining PE to a PE ID in a stored PE ID configuration and thereby assign the matched PE ID to the joining PE (block 504). This matching can be performed in a manner that is similar to block 404 of FIG. 4.

Finally, if PE ID module 126 cannot find a matching PE ID in a stored PE ID configuration at block 504, module 126 can generate and assign a brand new PE ID to the joining PE (block 506). This new PE ID generation can be performed in a manner that is similar to block 406 of FIG. 4.

Returning again to FIG. 3, upon assigning a PE ID to the joining PE per the default mode logic of block 310 or the PE movement mode logic of block 312, PE ID module 126 can store the assigned PE ID with the joined PE in, e.g., the internal topology database of CB 102 (block 314). Flowchart 300 can then end.

4. Topology-Based PE ID Configuration Generation and Merging

Figure 6:
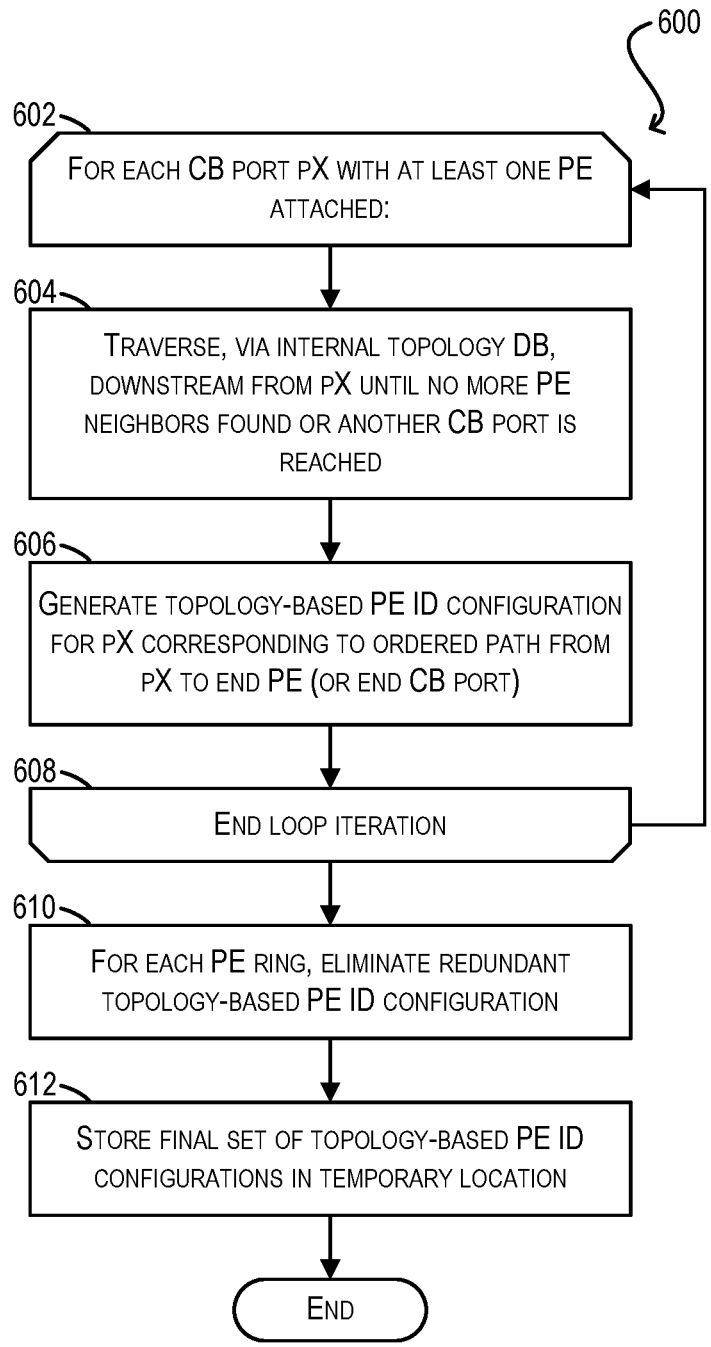
FIG. 6 depicts a workflow for generating topology-based PE ID configurations according to one embodiment.
Figure 7:
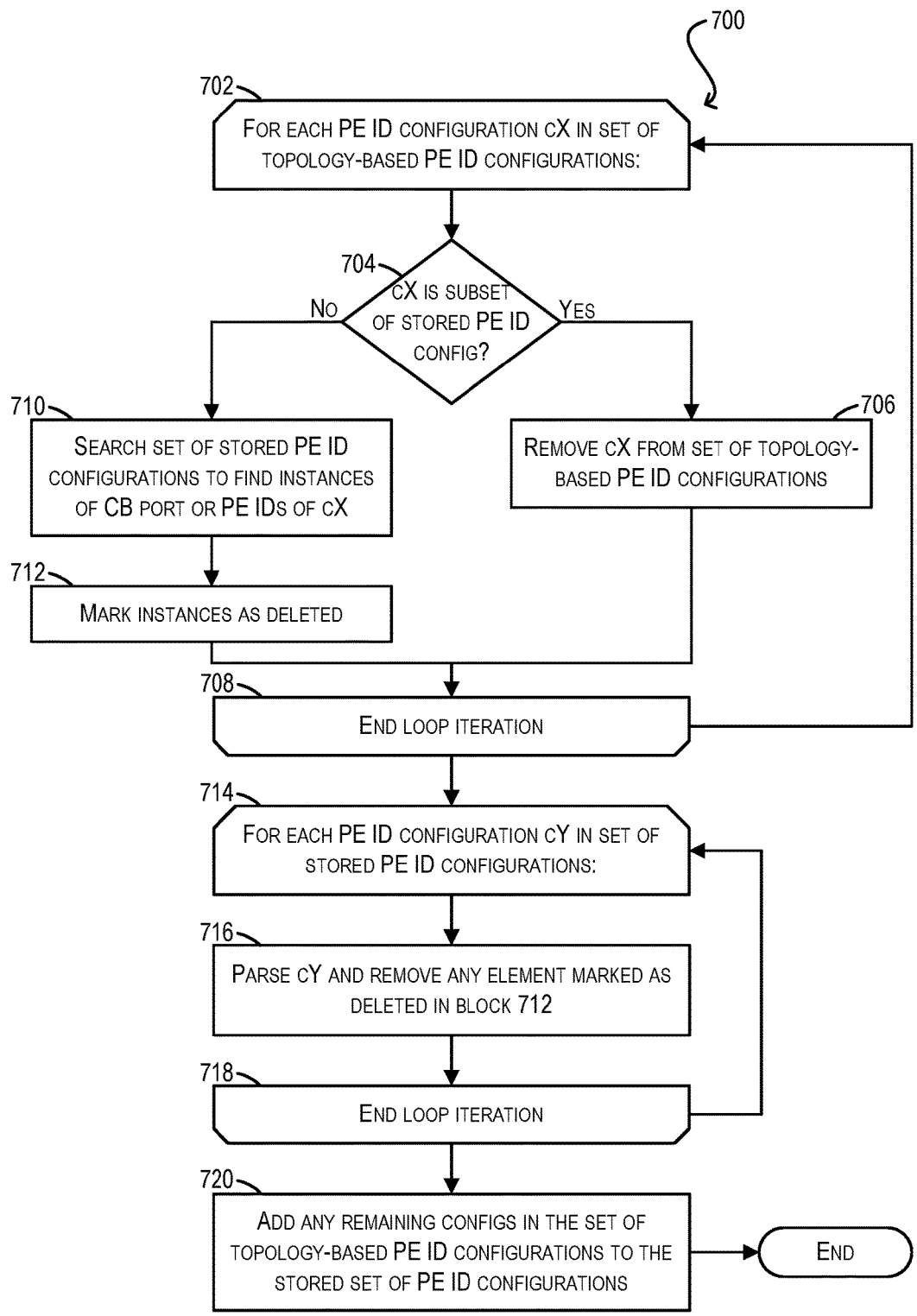
FIG. 7 depicts a workflow for merging topology-based PE ID configurations into a set of stored PE ID configurations according to one embodiment.

As noted with respect to blocks 214 and 216 of FIG. 2, once CB 102 has processed a bridge topology change (e.g., the joining of a new PE or the removal of an existing PE), PE ID module 126 can (1) generate a set of topology-based PE ID configurations based on the current bridge topology and (2) merge the topology-based PE ID configurations into the stored PE ID configurations, thereby resulting in a new stored set. FIGS. 6 and 7 depicts flowcharts 600 and 700 for performing processes (1) and (2) respectively according to certain embodiments.

Starting with block 602 of FIG. 6, PE ID module 126 enter a loop for each CB port of CB 102 that has at least one PE attached. Within the loop, PE ID module 126 can traverse, via the CB's internal topology database, from the current CB port (i.e., port pX) down the chain/ring of PEs connected to that port until no more PE neighbors are found (in the case of a chain) or another CB port is reached (in the case of a ring) (block 604). Upon reaching the end of the PE chain/ring, PE ID module 126 can generate a topology-based PE ID configuration for CB port pX that corresponds to the ordered path from port pX to the end PE (or end CB port) (block 606). The current loop iteration can then end (block 608) and PE ID module 126 can return to the top of loop 602 in order to repeat the process for the next CB port.

Once all of the CB ports have been processed, PE ID module 126 will have generated a complete set of topology-based PE ID configurations. It should be noted that, in cases where the topology includes one or more PE rings, the processing of blocks 602-608 will necessarily generate two PE ID configurations for each ring—one "forward" configuration (e.g., "pe-id p1 X Y Z p2" and one "reverse" configuration (e.g., "pe-id p2 Z Y X p1"). This is because blocks 602-608 will cause the PE ID module 126 to traverse the PE ring twice (once from each end CB port of the ring). Accordingly, in these cases, PE ID module 126 can eliminate one of these two PE ID configurations for each PE ring in order to remove this redundancy (block 610). PE ID module 126 can then store the final set of topology-based PE ID configurations in a temporary location (block 612) and flowchart 600 can end.

Turing now to the merging process of FIG. 7, at block 702 PE ID module 126 can enter a loop for each PE ID configuration in the set of topology-based PE ID configurations. Within this loop, PE ID module 126 can check whether the current configuration (i.e. "cX") is a subset of any stored PE ID configuration (block 704), where the term "subset" means that the all of the components of cX (i.e., the CB port and PE IDs) can be found in the same connection order, either forward or backward, in the stored PE ID configuration. For instance, consider an example PE ID configuration "pe-id p1 19 20 21 p2." In this case, both "pe-id p2 21 20 19 p1" and "pe-id p1 19 20" can be considered a subset of "pe-id p1 19 20 21 p2." On the other hand, "pe-id p1 19 21" cannot be considered a subset of "pe-id p1 19 20 21 p2" because the PE ID elements 19 and 21 do not appear in the same connection order.

If the answer at block 704 is yes (i.e., cX is subset of a stored PE ID configuration), PE ID module 126 can remove cX from the set of topology-based PE ID configurations (block 706) and the current loop iteration can end (block 708).

However, if the answer at block 704 is no (i.e., cX is not a subset of any stored PE ID configuration), PE ID module 126 can search the set of stored PE ID configurations to find every instance in those stored configurations where the CB port or PE IDs of cX are found (block 710). PE ID module 126 can then mark those found instances as being "deleted" (block 712) and the current loop iteration can end.

Once PE ID module 126 has exited loop 702, module 126 can enter a second loop for each PE ID configuration in the set of stored PE ID configurations (block 714). Within this second loop, PE ID module 126 can parse the current configuration (i.e., "cY") and can remove any element (e.g., CB port or PE ID) in cY that has been marked as "deleted" per previous block 712 (block 716). In the case where the deleted element(s) include the CB port and/or all of the PE IDs in cY, PE ID module 126 can remove the entirety of cY from the set of stored PE ID configurations. Further, in the case where cY defines a PE ring (e.g., "pe-id p1 X Y Z p2")

and the deleted element causes the ring to be split in two (e.g., PE ID Y is deleted), PE ID module 126 can automatically split cY into two separate configurations (e.g., "pe-id p1 X" and "pe-id p2 Z").

Finally, once PE ID module 126 has exited loop 714, PE ID module 126 can add any remaining configurations in the set of topology-based PE ID configurations to the set of stored PE ID configurations, resulting in a set of merged PE ID configurations (block 720). Flowchart 700 can then end.

To further clarify the merging process described in FIG. 7, consider an example where the set of stored PE ID configurations includes the entries below:
pe-id p1 19 21 22 p2
pe-id p3 25 26 28 p4
pe-id p5 30 33 31
pe-id p6 38 40 36 p7

Listing 7

Further, assume that the set of topology-based PE ID configurations includes the entries below:
pe-id p2 22 21
pe-id p5 25 40

Listing 8

In this scenario, the execution of flowchart 700 results in the following:
1. Since the topology-based PE ID configuration "pe-id p2 22 21" is a subset of the stored PE ID configuration "pe-id p1 19 21 22 p2", "pe-id p2 22 21" is removed from the set of topology-based PE ID configurations
2. The set of stored PE ID configurations is marked with "deleted" elements as follows (denoted by "(X)"):
   pe-id p1 19 21 22 p2
   pe-id p3 25(X) 26 28 p4
   pe-id p5(X) 30 33 31
   pe-id p6 38 40(X) 36 p7
3. The set of stored PE ID configurations is processed and the deleted elements are removed as follows:
   pe-id p1 19 21 22 p2
   pe-id p4 28 26
   pe-id p6 38
   pe-id p7 36
4. The remaining topology-based PE ID configuration "pe-id p5 25 40" is added to the set of stored PE ID configurations, resulting in the following final merged set:
   pe-id p1 19 21 22 p2
   pe-id p4 28 26
   pe-id p6 38
   pe-id p7 36
   pe-id p5 25 40

As can be seen in the example above, the merging process of FIG. 7 can handle scenarios where a given PE ID configuration for a PE ring is split into two configurations for separate PE chains (e.g., "pe-id p6 38 40 36 p7" is split to two chain configurations "pe-id p6 38" and "pe-id p7 36" because PE ID 40 is used by a topology-based PE ID configuration). This merging process can also handle scenarios where two chain configurations should be combined into a single ring configuration. For instance, in the example scenario above, assume a user subsequently makes a physical connection of p6-38-36-p'7. In this case, the algorithm will generate a "pe-id p6 38 36 p7" configuration in the merged set because of the following:

"pe-id p6 38 36 p7" is not subset of any stored PE ID configuration per block 704

Both "pe-id p6 38" and "pe-id p7 36" are removed at block 716

"pe-id p6 38 36 p7" is added at block 720

One limitation with the merging process of FIG. 7 is that cannot remove from the set of stored PE ID configurations any PE IDs that are no longer in use. For example, assume that the current topology and stored set of PE ID configurations include "pe-id p1 1 2." Further assume that a new PE joins after PE ID 2, such that the topology and stored set of configurations are changed to become "pe-id p1 1 2 3." If a user subsequently detaches PE ID 3, the "pe-id p1 1 2 3" configuration will not change because the topology generated PE ID configuration for CB port p1 will be a subset of the stored PE ID configuration. Further, if the user then attaches the PE corresponding to previous PE ID 3 to another CB or PE cascade port, that PE will be assigned a new, different PE ID because the stored PE ID configuration for that CB port will not match the new topology. Therefore, a new PE ID configuration will be generated. If the user keeps moving the same PE unit to different cascade ports/LAGs, the stored PE ID configurations may grow in size to consume all possible PE IDs.

To address this problem, in certain embodiments each PE ID in the set of stored PE ID configurations can be associated with a static/dynamic flag. In a particular embodiment, if a given PE ID is read from the CB's non-volatile memory upon boot up (i.e., it was stored by the CB prior to a reboot), then its flag can be set to static. Otherwise, its flag can be set to dynamic (this will generally apply to PE IDs that are generated automatically during system runtime, such as at the time a new PE joins).

With this per-PE ID static/dynamic flag in place, PE ID module 126 can, at the very start of the merging process of FIG. 7, automatically remove all PE IDs from the set of stored PE ID configurations whose flag is dynamic. This will prevent the set of stored configurations from growing in size if, e.g., a user moves around PE units during system runtime. If the user wishes to keep a particular topology of PE IDs, the user can simply save the CB's runtime configuration to non-volatile memory, which will cause the flags of all existing PE IDs in the set of stored configurations to become static.

5. PE ID Change Tool

In some cases, a user may wish to change PE IDs for one or more existing PEs that have already joined an extended bridge. One way to accomplish this is to manually detach the PEs, edit the PE ID configurations for those PEs via the pe-id CLI command, and then manually re-attach the PEs. This will cause the PEs to rejoin the bridge and cause the CB to assign the PEs new PE IDs based on the newly edited PE ID configurations. However, this method is time consuming and error prone.

Figure 8:
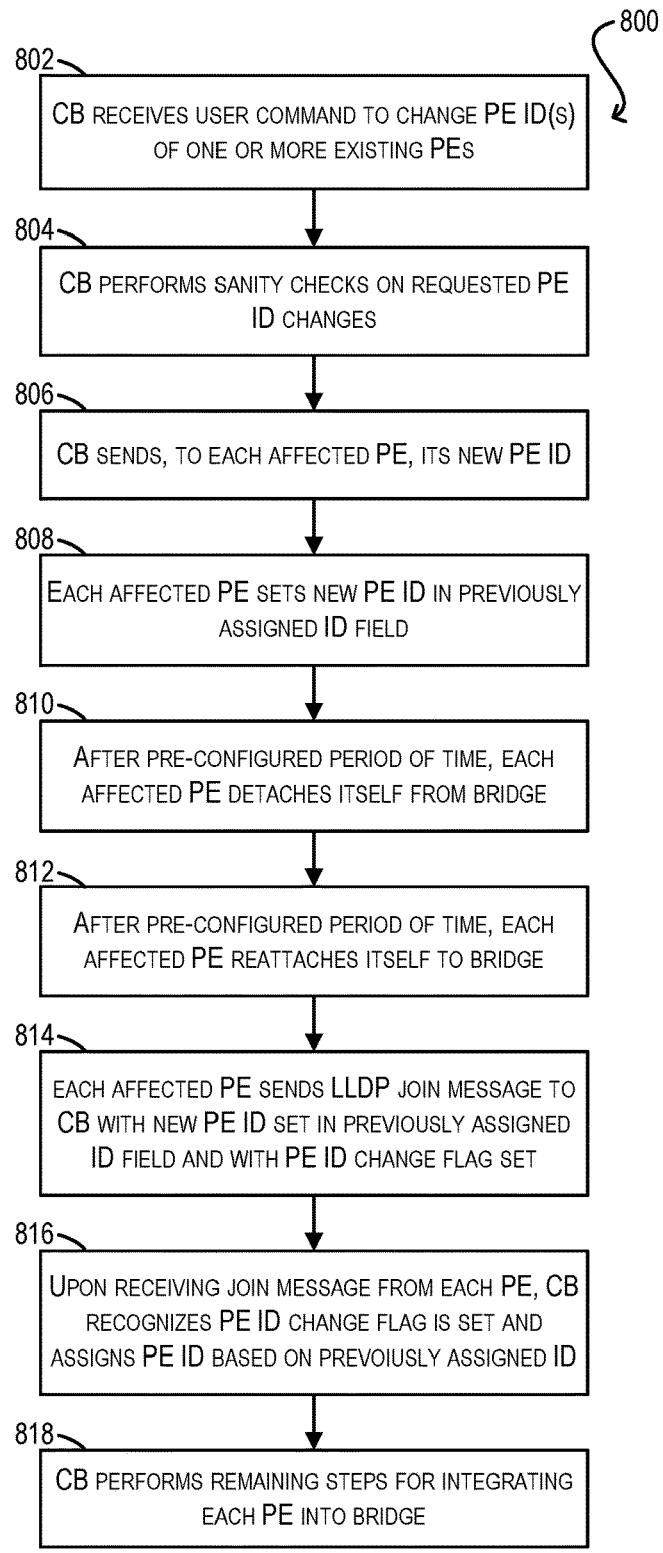
FIG. 8 depicts workflow for changing PE IDs of existing PEs according to one embodiment.

To address this, in certain embodiments CB 102 can provide an interactive tool that enables users to change the PE IDs of one or multiple PEs in an efficient manner. FIG. 8 depicts a flowchart 800 of a process that may be carried out by CB 102 when using this tool according to an embodiment.

At block 802, CB 102 can receive, via the interactive tool, a user command to change the PE IDs of one or more existing PEs in extended bridge 100 (e.g., "pe-id change 1→10 2→20"). In response, CB 102 can perform various sanity checks to ensure that the requested change(s) are valid (e.g., the original PE IDs exist, the new PE IDs are not in use, etc.) (block 804).

Assuming the sanity checks pass, CB 102 can send, to each affected PE, its new PE ID (block 806). This can cause each said PE to set the new PE ID in a "previously assigned ID" field maintained locally by the PE (block 808).

At block 810, each affected PE can wait for a preconfigured period of time (e.g., a few seconds) to ensure that any communication to other PEs through itself can complete. Each affected PE can then detach itself from the extended bridge by bringing down all of its cascade ports/LAGs. As part of this, the PE (and the CB) can perform its typically cleanup work in response to this type of port down event.

After another preconfigured period of time (e.g., a few seconds), each affected PE can bring up all of its cascade ports/LAGs again (block 812). Once these ports are operational, each PE can send LLDP join messages to CB 102 with the PE ID change flag (mentioned previously) set to on, and with the "previously assigned ID" field of the join message populated with its new PE ID (block 814).

Upon receiving the join message from a given PE, CB 102 recognize that the PE ID change flag is set and, in response, can execute the assignment sub-process of FIG. 3 in the PE movement mode. This can cause the CB to assign the PE a PE ID based on the "previous assigned ID" (which contains the new ID) (block 816).

Finally, at block 818, CB 102 can perform any remaining steps need to integrate the PE with its new PE ID into the extended bridge.

6. Example Network Device

Figure 9:
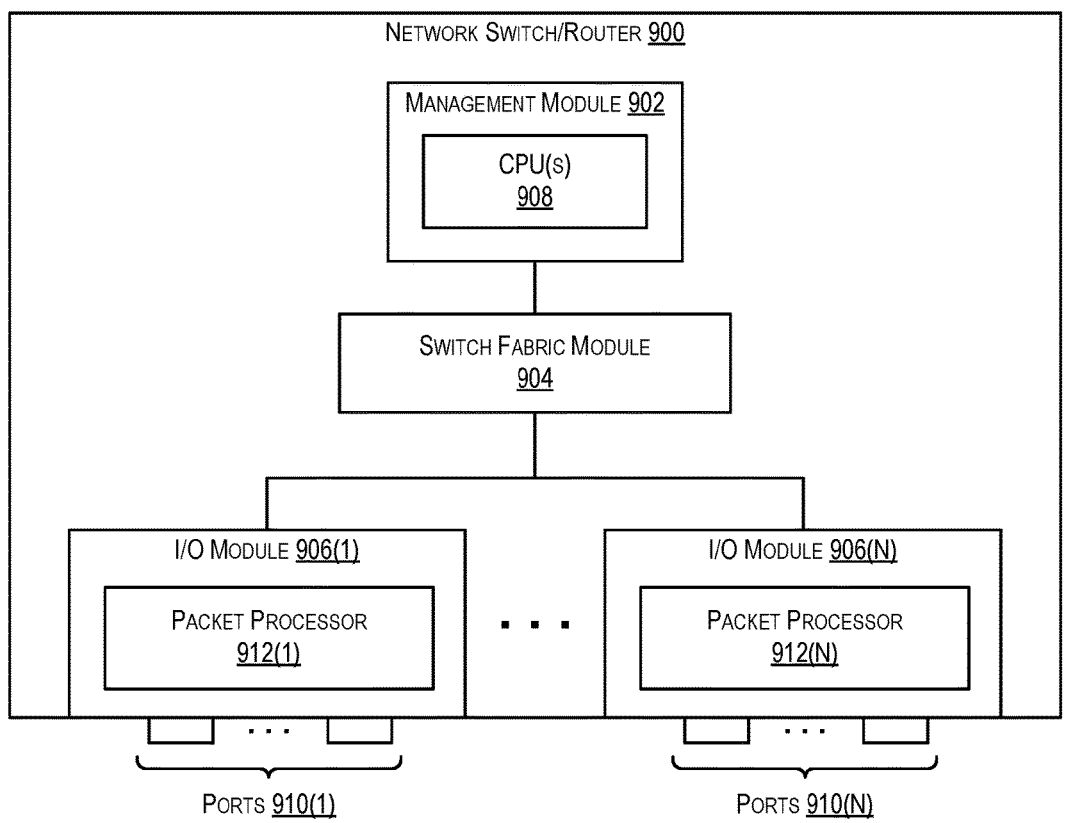
FIG. 9 depicts a block diagram of a network router according to one embodiment.

FIG. 9 depicts an example network device (e.g., switch/router) 900 according to an embodiment. Network switch/router 900 can be used to implement any of the PEs or CBs described throughout this disclosure.

As shown, network switch/router 900 includes a management module 902, a switch fabric module 904, and a number of I/O modules 906(1)-906(N). Management module 902 includes one or more management CPUs 908 for managing/controlling the operation of the device. Each management CPU 908 can be a general purpose processor, such as a PowerPC, Intel, AMD, or ARM-based processor, that operates under the control of software stored in an associated memory (not shown).

Switch fabric module 904 and I/O modules 906(1)-906(N) collectively represent the data, or forwarding, plane of network switch/router 900. Switch fabric module 904 is configured to interconnect the various other modules of network switch/router 900. Each I/O module 906(1)-906(N) can include one or more input/output ports 910(1)-910(N) that are used by network switch/router 900 to send and receive data packets. Each I/O module 906(1)-906(N) can also include a packet processor 912(1)-912(N). Packet processor 912(1)-912(N) is a hardware processing component (e.g., an FPGA or ASIC) that can make wire speed decisions on how to handle incoming or outgoing data packets.

It should be appreciated that network switch/router 900 is illustrative and not intended to limit embodiments of the present invention. Many other configurations having more or fewer components than switch/router 900 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
storing, by a controlling bridge (CB) in an extended bridge, a set of one or more port extender (PE) ID configurations, wherein at least one PE ID configuration in the stored set includes:
an identity of a first CB port; and
a plurality of PE IDs corresponding to a plurality of PEs connected to the first CB port, the plurality of PE IDs being sorted in connection order, and
wherein the stored set further comprises a second PE ID configuration that includes a provisional PE ID for a PE that has not yet joined the extended bridge.

2. The method of claim 1 wherein the plurality of PEs are further connected to a second CB port, and wherein the at least one PE ID configuration further includes an identity of the second CB port.

3. The method of claim 1 wherein the second PE ID configuration is entered into the CB by a user.

4. The method of claim 1 further comprising, at the time a PE joins the extended bridge:
receiving a join message from the joining PE that includes a previously assigned PE ID for the joining PE; and
assigning a PE ID to the joining PE.

5. The method of claim 1 further comprising:
receiving a user command to apply a new PE ID to a PE already connected to the extended bridge; and
transmitting the new PE ID to the PE,
wherein in response to receiving the new PE ID, the PE is configured to:
automatically detach itself from and re-attach itself to the extended bridge; and
upon re-attaching itself to the extended bridge, transmit a join message to the CB that includes the new PE ID in a previously assigned ID field and a PE ID change flag set to enabled.

6. A non-transitory computer readable storage medium having stored thereon program code executable by a controlling bridge (CB) in an extended bridge, the program code causing the CB to:
store a set of one or more port extender (PE) ID configurations, wherein at least one PE ID configuration in the stored set includes:
an identity of a first CB port; and
a plurality of PE IDs corresponding to a plurality of PEs connected to the first CB port, the plurality of PE IDs being sorted in connection order,
wherein the stored set further comprises a second PE ID configuration that includes a provisional PE ID for a PE that has not yet joined the extended bridge.

7. The non-transitory computer readable storage medium of claim 6 wherein the plurality of PEs are further connected to a second CB port, and wherein the at least one PE ID configuration further includes an identity of the second CB port.

8. The non-transitory computer readable storage medium of claim 6 wherein the program code further causes the CB to, at the time a PE joins the extended bridge:
receive a join message from the joining PE that includes a previously assigned PE ID for the joining PE; and
assign a PE ID to the joining PE.

9. A method comprising:
storing, by a controlling bridge (CB) in an extended bridge, a set of one or more port extender (PE) ID configurations, wherein at least one PE ID configuration in the stored set includes:
an identity of a first CB port; and
a plurality of PE IDs corresponding to a plurality of PEs connected to the first CB port, the plurality of PE IDs being sorted in connection order; and
at the time a PE joins the extended bridge:
receiving, by the CB, a join message from the joining PE that includes a previously assigned PE ID for the joining PE; and
assigning, by the CB, a PE ID to the joining PE.

10. The method of claim 9 wherein assigning a PE ID to the joining PE comprises:
determining whether to operate according to a first PE ID assignment mode or a second PE ID assignment mode; and
if the CB determines that it should operate according to the first PE ID assignment mode, assigning a PE ID to the joining PE using logic that gives precedence to the stored set of one or more PE ID configurations.

11. The method of claim 10 wherein the logic that gives precedence to the stored set of one or more PE ID configurations comprises:
attempting to match the joining PE to a PE ID in the stored set of one or more PE ID configurations; and
if the CB cannot match the joining PE to a PE ID in the stored set of one or more PE ID configurations, attempting to assign the previously assigned PE ID in the join message to the joining PE; and
if the CB cannot assign the previously assigned PE ID to the joining PE, generating a new PE ID for the joining PE.

12. The method of claim 10 wherein if the CB determines that it should operate according to the second PE ID assignment mode, the method further comprises:
assigning a PE ID to the joining PE using logic that gives precedence to the previously assigned PE ID in the join message.

13. The method of claim 12 wherein the logic that gives precedence to the previously assigned PE ID comprises:
attempting to assign the previously assigned PE ID in the join message to the joining PE; and
if the CB cannot assign the previously assigned PE ID to the joining PE, attempting to match the joining PE to a PE ID in the stored set of one or more PE ID configurations; and
if the CB cannot match the joining PE to a PE ID in the stored set of one or more PE ID configurations, generating a new PE ID for the joining PE.

14. The method of claim 10 wherein the CB determines whether to operate according to the first PE ID assignment mode or the second PE ID assignment mode based on a user-configurable setting.

15. The method of claim 10 wherein the CB determines whether to operate according to the first PE ID assignment mode or the second PE ID assignment mode based on a PE ID change flag included in the join message.

16. The method of claim 9 further comprising, subsequently to assigning a PE ID to the joining PE:
generating a set of one or more topology-based PE ID configurations for the extended bridge; and
merging the set of one or more topology-based PE ID configurations into the stored set of one or more PE ID configurations to create a merged set.

17. The method of claim 16 wherein the merged set is a superset of the set of one or more topology-based PE ID configurations.

18. A controlling bridge (CB) for use in an extended bridge, the CB comprising:
a processor; and
a non-transitory computer readable medium having stored thereon program code that, when executed by the processor, causes the processor to:
store a set of one or more port extender (PE) ID configurations, wherein at least one PE ID configuration in the stored set includes:
an identity of a first CB port; and
a plurality of PE IDs corresponding to a plurality of PEs connected to the first CB port, the plurality of PE IDs being sorted in connection order,
wherein the stored set further comprises a second PE ID configuration that includes a provisional PE ID for a PE that has not yet joined the extended bridge.

19. The CB of claim 18 wherein the plurality of PEs are further connected to a second CB port, and wherein the at least one PE ID configuration further includes an identity of the second CB port.

20. The CB of claim 18 wherein the program code further causes the processor to, at the time a PE joins the extended bridge:
receive a join message from the joining PE that includes a previously assigned PE ID for the joining PE; and
assign a PE ID to the joining PE.

21. A method comprising:
storing, by a controlling bridge (CB) in an extended bridge, a set of one or more port extender (PE) ID configurations, wherein at least one PE ID configuration in the stored set includes:
an identity of a first CB port; and
a plurality of PE IDs corresponding to a plurality of PEs connected to the first CB port, the plurality of PE IDs being sorted in connection order;
receiving, by the CB, a user command to apply a new PE ID to a PE already connected to the extended bridge; and
transmitting, by the CB, the new PE ID to the PE,
wherein in response to receiving the new PE ID, the PE is configured to:
automatically detach itself from and re-attach itself to the extended bridge; and
upon re-attaching itself to the extended bridge, transmit a join message to the CB that includes the new PE ID in a previously assigned ID field and a PE ID change flag set to enabled.

* * * * *